US009407146B2

(12) United States Patent
Taya

(10) Patent No.: US 9,407,146 B2
(45) Date of Patent: Aug. 2, 2016

(54) POWER SOURCE CIRCUIT AND METHOD OF CONTROLLING POWER SOURCE CIRCUIT

(71) Applicant: LAPIS SEMICONDUCTOR CO., LTD., Kanagawa (JP)

(72) Inventor: Takashi Taya, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 0 days.

(21) Appl. No.: 14/833,198

(22) Filed: Aug. 24, 2015

(65) Prior Publication Data

US 2016/0065050 A1    Mar. 3, 2016

(30) Foreign Application Priority Data

Aug. 28, 2014  (JP) ................................. 2014-174540

(51) Int. Cl.
| | |
|---|---|
| G05F 1/563 | (2006.01) |
| H02M 3/158 | (2006.01) |
| G05F 5/00 | (2006.01) |
| H02J 7/00 | (2006.01) |
| H02M 1/00 | (2006.01) |

(52) U.S. Cl.
CPC ............ *H02M 3/158* (2013.01); *G05F 1/563* (2013.01); *G05F 5/00* (2013.01); *H02J 7/0065* (2013.01); *H02M 3/1584* (2013.01); *H02M 3/1588* (2013.01); *H02M 2001/0032* (2013.01); *H02M 2001/0045* (2013.01); *H02M 2001/0048* (2013.01)

(58) Field of Classification Search
CPC .......... H02M 1/36; H02M 2001/0032; H02M 2001/0045; H02M 2001/0067; H02M 2001/007; H02M 3/158; H02M 3/1584; G05F 5/00; G05F 1/59; G05F 1/563

USPC .......... 323/266, 268, 28, 273, 282, 284, 285, 323/299, 303
See application file for complete search history.

(56) References Cited

U.S. PATENT DOCUMENTS

| | | | | |
|---|---|---|---|---|
| 6,441,591 B2 * | 8/2002 | Nokkonen | ............ | H02M 3/155 323/266 |
| 6,661,211 B1 * | 12/2003 | Currelly | .............. | H02M 3/1584 323/268 |
| 7,084,612 B2 * | 8/2006 | Zinn | ...................... | H02M 3/158 323/284 |
| 7,397,151 B2 * | 7/2008 | Ishino | .................. | H02M 3/1584 323/268 |

(Continued)

FOREIGN PATENT DOCUMENTS

| | | |
|---|---|---|
| JP | H05-236650 A | 9/1993 |
| JP | 2003-216247 A | 7/2003 |
| JP | 2009-177909 A | 8/2009 |

*Primary Examiner* — Gary L Laxton
*Assistant Examiner* — Jye-June Lee
(74) *Attorney, Agent, or Firm* — Kubotera & Associates, LLC

(57) ABSTRACT

A power source circuit includes a power source terminal for inputting a power source voltage; a switching regulator including a switching circuit connected to the power source terminal and a smoothing circuit connected to the switching circuit; a series regulator connected to the switching regulator in series; a switching portion; and a control portion. The smoothing circuit includes a capacitor and an inductor to output a first voltage. The series regulator is connected to the switching circuit and the smoothing circuit in series to output a second voltage. The switching portion supplies the power source voltage to the series regulator. The control portion outputs a switching signal for controlling the switching portion to turn on or off according to the power source voltage.

7 Claims, 3 Drawing Sheets

Power source circuit 1

(56) References Cited

U.S. PATENT DOCUMENTS

| | | | | |
|---|---|---|---|---|
| 2003/0117117 A1* | 6/2003 | Zinn | H02M 3/1584 323/273 |
| 2006/0290203 A1* | 12/2006 | Muller | H02M 3/158 307/11 |
| 2007/0024256 A1* | 2/2007 | Chou | H02M 3/1584 323/268 |
| 2007/0290657 A1* | 12/2007 | Cretella | H02M 3/1584 323/222 |
| 2009/0184700 A1* | 7/2009 | Kanayama | H02M 3/158 323/282 |
| 2010/0090673 A1* | 4/2010 | Nakagawa | H02M 3/1584 323/284 |
| 2013/0176011 A1* | 7/2013 | Muhammad | H02M 3/1584 323/283 |

* cited by examiner

Power source circuit 1

POWER SOURCE CIRCUIT AND METHOD OF CONTROLLING POWER SOURCE CIRCUIT

BACKGROUND OF THE INVENTION AND RELATED ART STATEMENT

The present invention relates to a power source circuit and a method of controlling the power source circuit. In particular, the present invention relates to a power source circuit utilized for a wireless communication LSI (Large Scale Integrated circuit) and a method of controlling the power source circuit.

In a conventional LSI (Large Scale Integrated circuit) used for wireless communication, a power source circuit is provided for removing a fluctuation and a noise of a voltage supplied thereto, so that the power source circuit supplies an output voltage at a constant level with less noise to an internal circuit. It has been known that the power source circuit for supplying the output voltage includes a switching regulator of a step-down type formed of a switching element and an inductor capacitor, and a series regulator formed of a calculation amplifier and an output transistor of a linear operation type.

When a conventional communication device is designed to operate with a battery as a power source, it is desirable that the conventional communication device is operational with respect to a power source voltage within a wide range. The switching regulator outputs the power source voltage supplied from the power source to the inductor capacitor as necessary, so that the switching regulator converts the power source voltage to the output voltage. Accordingly, it is possible to minimize power loss. However, when the power source voltage is decreased, a conversion efficiency of the switching regulator tends to be deteriorated, or even the switching regulator is not able to perform the switching operation. Accordingly, the switching regulator tends to have a relatively narrow range of the appropriate voltage input from the power source.

On the other hand, the series regulator is capable of dealing with a wide range of the power source voltage, and further is capable of finely controlling the output transistor. Accordingly, it is possible to obtain the appropriate output voltage. However, when the power source voltage is high, it is necessary to drop the power source voltage to the output voltage, thereby increasing power loss.

Patent References 1 to 3 have disclosed a power source device, in which the switching regulator and the series regulator are connected in parallel or in series to utilize beneficial features of the switching regulator and the series regulator. Accordingly, the power source devices disclosed in Patent References 1 to 3 are capable of dealing with the power source voltage within a wide range while minimizing power loss.

Patent Reference 1: Japanese Patent Publication No. 2003-216247
Patent Reference 2: Japanese Patent Publication No. 05-236650
Patent Reference 3: Japanese Patent Publication No. 2009-177909

According to Patent Reference 1, the power source device is formed of the switching regulator and the series regulator connected in parallel. It is configured such that the switching regulator and the series regulator are switched according to a control signal.

According to Patent Reference 2, the power source device is formed of the switching regulator and the series regulator connected in series. In the power source device, it is possible to switch according to the power source voltage whether the switching regulator and the series regulator both are operated to generate the output voltage, or only the series regulator is operated to generate the output voltage.

According to Patent Reference 3, the power source device is formed of the switching regulator and the series regulator connected in series. Further, the power source device performs an operation in a stand-by mode or a normal mode. When the power source device performs the operation in the stand-by mode, the power source voltage is supplied to a voltage smoothing capacitor, so that it is possible to shorten a raising time upon returning to the normal mode.

As described above, in the power source device disclosed in Patent Reference 1, the switching regulator and the series regulator are connected in parallel, and are switched to generate the output voltage. Accordingly, the power source device tends to generate a large noise upon switching.

Further, in the power source devices disclosed in Patent Reference 2 and Patent Reference 3, the switching regulator and the series regulator are connected in series, and are separately controlled to operate and generate the output voltage. Accordingly, it is possible to minimize a large noise upon switching as is the case that the switching regulator and the series regulator are connected in parallel. However, it is difficult to provide a power source circuit for wireless communication capable of shortening a raising time while minimizing power consumption.

In general, an LSI used for wireless communication is provided with a lithium button battery as the power source thereof, and the lithium button battery generates the power source voltage between about 1.6 V and 3.6 V. In order to reduce the power consumption of the LSI used for wireless communication, it is necessary to intermittently terminate an operation of the LSI. Accordingly, it is configured such that the LSI switches an idle state and an operation state, thereby reducing the power consumption thereof. In a normal usage, the LSI tends to be in the idle state for a longer period of time. Accordingly, it is imperative to shorten the raising time of the LSI while reducing the power consumption thereof in the idle state.

To this end, for example, in the power source device disclosed in Patent Reference 3, the voltage smoothing capacitor is maintained at the power source potential even in the stand-by state. However, even when the voltage smoothing capacitor is maintained at the power source potential, the voltage smoothing capacitor still supplies electron charges up to the power source potential, or discharges electron charges to the voltage range of the series regulator during the operation, thereby consuming power. Accordingly, it is difficult to sufficiently reduce the power consumption.

Further, in the power source device disclosed in Patent Reference 3, in the stand-by state, the voltage smoothing capacitor is controlled at the potential significantly different from that thereof when the switching regulator performs a normal operation. Accordingly, when the power source device is transited from the stand-by state to the normal operation state, it is necessary to adjust the voltage accumulated in the voltage smoothing capacitor to a proper range. Accordingly, it is difficult to sufficiently shorten the raising time.

In view of the problems of the conventional power source devices described above, an object of the present invention is to provide a power source circuit and a method of controlling a power source circuit capable of shortening the raising time while minimizing the power consumption of the power source circuit.

Further objects and advantages of the invention will be apparent from the following description of the invention.

SUMMARY OF THE INVENTION

In order to attain the objects described above, according to a first aspect of the present invention, a power source circuit includes a power source terminal for inputting a power source voltage; a switching regulator including a switching circuit connected to the power source terminal and a smoothing circuit connected to the switching circuit; a series regulator connected to the switching regulator in series; a switching portion; and a control portion.

According to the first aspect of the present invention, the smoothing circuit includes a capacitor and an inductor, so that the smoothing circuit smoothes an output from the switching circuit to output a first voltage. The series regulator is connected to the switching circuit and the smoothing circuit in series. Further, the switching regulator is configured to receive the first voltage or the power source voltage, so that the series regulator outputs a second voltage. The switching portion has a first terminal connected to the power source and a second terminal connected between the switching regulator and the series regulator, so that the switching portion supplies the power source voltage to the series regulator.

According to the first aspect of the present invention, the control portion is configured to output a control signal for controlling an operation state in which the series regulator outputs the second voltage and an idle state in which the switching regulator and the series regulator stop operating. Further, the control portion is configured to measure the power source voltage during the operation state, and to output a switching signal for controlling the switching portion to turn on or off in the idle state according to a measurement result of the power source voltage.

According to a second aspect of the present invention, a method is for controlling a power source circuit. The power source circuit includes a power source terminal for inputting a power source voltage; a switching regulator including a switching circuit connected to the power source terminal and a smoothing circuit connected to the switching circuit; a series regulator connected to the switching regulator in series; and a switching portion.

According to the second aspect of the present invention, the smoothing circuit includes a capacitor and an inductor, so that the smoothing circuit smoothes an output from the switching circuit to output a first voltage. The series regulator is connected to the switching circuit and the smoothing circuit in series. Further, the series regulator is configured to receive the first voltage or the power source voltage, so that the series regulator outputs a second voltage. The switching portion has a first terminal connected to the power source and a second terminal connected between the switching regulator and the series regulator, so that the switching portion supplies the power source voltage to the series regulator.

According to the second aspect of the present invention, the method includes the steps of: measuring the power source voltage during an operation state of the power source circuit; comparing the power source voltage thus measured with a specific voltage when the operation state is transited to an idle state; controlling the switching regulator and the series regulator to be in the idle state, and controlling the switching portion to turn off when the power source voltage is greater than the specific voltage; and controlling the switching regulator and the series regulator to be in the idle state, and controlling the switching portion to turn on so that the power source circuit is switched to the idle state when the power source voltage is smaller than the specific voltage.

According to the present invention, it is possible to shorten a raising time while minimizing power consumption of the power source circuit.

BRIEF DESCRIPTION OF THE DRAWINGS

FIGS. 3(a) to 3(d) are graphs showing an operation of the power source circuit according to the embodiment of the present invention, wherein FIG. 3(a) is a graph showing a power source voltage of the power source circuit, FIG. 3(b) is a graph showing an output voltage of a switching regulator of the power source circuit, FIG. 3(c) is a graph showing a voltage of a capacitor of the power source circuit, and FIG. 3(d) is a graph showing an output voltage of a series regulator of the power source circuit.

DETAILED DESCRIPTION OF PREFERRED EMBODIMENTS

Hereunder, preferred embodiments of the present invention will be explained with reference to the accompanying drawings.

Figure 1:
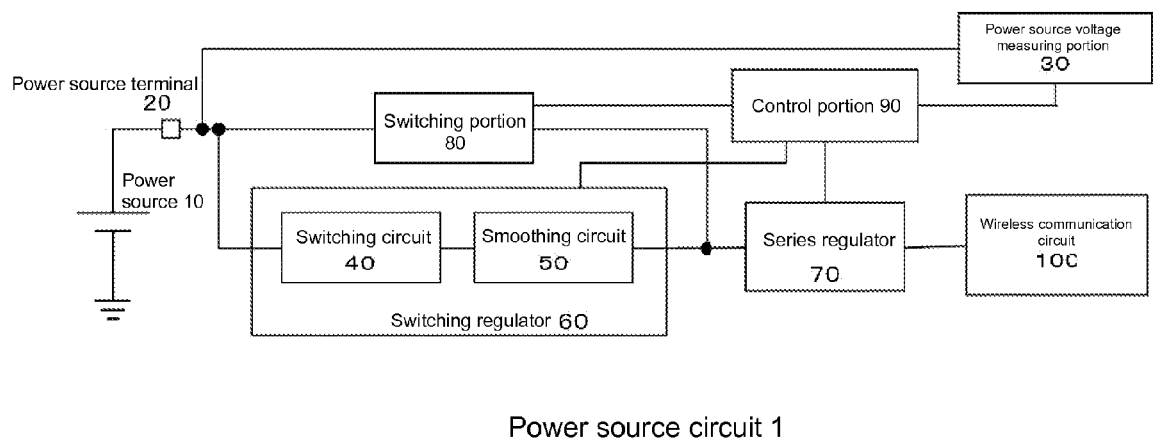
FIG. 1 is a block diagram showing a configuration of a power source circuit according to an embodiment of the present invention.

FIG. 1 is a block diagram showing a configuration of a power source circuit 1 according to an embodiment of the present invention.

As shown in FIG. 1, the power source circuit 1 includes a power source 10 for supplying a power source voltage: a power source terminal 20 connected to the power source 10; a power source voltage measuring portion 30 connected to the power source terminal 20; a switching regulator 60; a series regulator 70 connected to the switching regulator 60; a switching portion 80; a control portion 90; and a wireless communication circuit 100.

Further, as shown in FIG. 1, the switching regulator 60 includes a switching circuit 40 connected to the power source terminal 20 and a smoothing circuit 50 connected to the switching circuit 40. The switching portion 80 includes one terminal connected to the power source terminal 20 and another terminal connected between the switching regulator 60 and the series regulator 70. The control portion 90 is configured to control the switching regulator 60, the series regulator 70, and the switching portion 80. Further, an output voltage from the series regulator 70 is supplied to the wireless communication circuit 100.

In the embodiment, the power source 10 may be formed of, for example, a lithium button battery and the like. The power source 10 supplies the power source voltage in a range between 1.6 V and 3.6 V.

In the embodiment, the power source terminal 20 is provided for receiving the power source voltage from the power source 10. Further, the power source terminal 20 is connected to the power source voltage measuring portion 30, the switching regulator 60, and the switching portion 80.

In the embodiment, the power source voltage measuring portion 30 is connected to the power source terminal 20, and is configured to measure the power source voltage according to a signal from the control portion 90, so that the power source voltage measuring portion 30 outputs a measurement result to the control portion 90. Further, the power source voltage measuring portion 30 is formed of, for example, an electrical circuit having relatively large power consumption about 1 mA such as, for example, an AD converter. The series regulator 70 supplies an output voltage to the power source voltage measuring portion 30, so that the power source voltage measuring portion 30 performs an operation.

In the embodiment, the switching regulator 60 is formed of the switching circuit 40 connected to the power source terminal 20 and the smoothing circuit 50 connected to the switching circuit 40. The switching regulator 60 is provided for dropping the power source voltage from the power source 10 to a voltage of, for example, about 1.5 V.

In the embodiment, the series regulator 70 is connected to the smoothing circuit 50 of the switching regulator 60. The series regulator 70 is provided for dropping the power source voltage or the voltage output from the switching regulator 60 to a voltage of, for example, about 1.2 V.

As described above, the switching portion 80 includes one terminal connected to the power source terminal 20 and another terminal connected between the smoothing circuit 50 of the switching regulator 60 and the series regulator 70. The switching portion 80 is capable of supplying the power source voltage to the series regulator 70 without passing through the switching regulator 60 according to the power source voltage, and is controlled according to a switching signal output from the control portion 90.

In the embodiment, the control portion 90 is connected to the power source voltage measuring portion 30. Further, the control portion 90 is configured to output the control signal and the switching signal to the switching regulator 60, the series regulator 70, and the switching portion 80, respectively.

In the embodiment, the wireless communication circuit 100 is formed of a load circuit to which the output voltage from the series regulator 70 is supplied, and is configured to perform wireless communication. More specifically, the wireless communication circuit 100 is provided for transmitting and receiving a signal with other wireless communication device through wireless communication.

Figure 2:
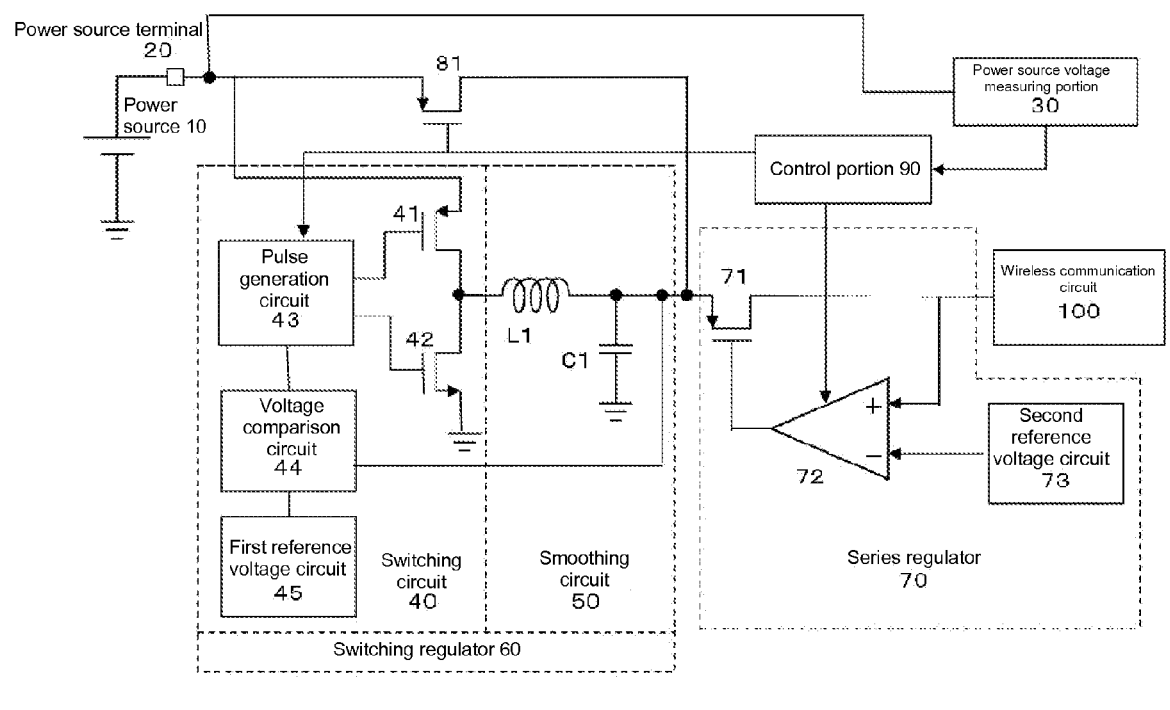
FIG. 2 is a circuit diagram showing the configuration of the power source circuit according to the embodiment of the present invention.

FIG. 2 is a circuit diagram showing the configuration of the power source circuit 1 according to the embodiment of the present invention. In FIG. 2, the switching regulator 60, the series regulator 70, and the switching portion 80 are partially represented with circuit diagrams.

As shown in FIG. 2, the switching circuit 40 of the switching regulator 60 includes a PMOS transistor 41; an NMOS transistor 42; a pulse generation circuit 43; a voltage comparison circuit 44; and a first reference voltage circuit 45. The PMOS transistor 41 has one end portion connected to the power source terminal 20 and the other end portion connected to an inductor L1. The NMOS transistor 42 has one end portion connected to the other end portion of the PMOS transistor 41 and the other end portion connected to ground.

In the embodiment, the pulse generation circuit 43 is provided for outputting a pulse wave to gate electrodes of the PMOS transistor 41 and the NMOS transistor 42, so that the PMOS transistor 41 and the NMOS transistor 42 are controlled. The voltage comparison circuit 44 is configured to receive the voltage output from the smoothing circuit 50 and a first reference voltage, and to compare the voltage and the first reference voltage, so that the voltage comparison circuit 44 outputs a difference to the pulse generation circuit 43. The first reference voltage circuit 45 is provided for supplying the first reference voltage to the voltage comparison circuit 44.

In the embodiment, the smoothing circuit 50 includes the inductor L1 connected to the other end portion of the PMOS transistor 41 and a capacitor C1. The capacitor C1 has one end portion connected to the inductor L1 and the other end portion connected to ground. The inductor L1 has an inductance of, for example, about 10 µH, and the capacitor C1 has a capacitance of, for example, about 10 µF.

In the embodiment, the voltage comparison circuit 44 of the switching regulator 60 compares the voltage output from the smoothing circuit 50 with the first reference voltage. Further, the pulse generation circuit 43 of the switching regulator 60 generates the pulse wave to turn on or off the PMOS transistor 41 and the NMOS transistor 42, so that the switching regulator 60 outputs the output voltage at a constant level. In particular, the pulse generation circuit 43 supplies the signal to the PMOS transistor 41 and the NMOS transistor 42 to turn off according to the signal from the control portion 90, so that the switching regulator 60 is in the idle state.

In the embodiment, the series regulator 70 includes a PMOS transistor 71; an operational amplifier 72 connected to a gate electrode of the PMOS transistor 71; and a second reference voltage circuit 73. The PMOS transistor 71 has one end portion connected to the inductor L1 and the capacitor C1, and the other end portion connected to the wireless communication circuit 100. The operational amplifier 72 is configured to receive the output from the other end portion of the PMOS transistor 71 and a second reference voltage. The second reference voltage circuit 73 is provided for supplying the second reference voltage to the operational amplifier 72. As described above, the series regulator 70 is configured to output the output voltage of about 1.2 V, and supply an electrical current of about 10 mA when the wireless communication circuit 100 is operated.

In the embodiment, the operational amplifier 72 of the series regulator 70 is configured to compare the output from the PMOS transistor 71 with the second reference voltage to control a gate voltage of the PMOS transistor 71, so that the series regulator 70 is operated to obtain the output voltage at a constant level. In the idle state, the operational amplifier 72 supplies a signal to the PMOS transistor 71 to turn off the PMOS transistor 71 according to a signal from the control portion 90, so that the series regulator 70 is in the idle state.

In the embodiment, the switching portion 80 is formed of a PMOS transistor 81. The PMOS transistor 81 is configured to turn on or off according to a signal from the control portion 90. Accordingly, it is possible to control whether the switching portion 80 supplies the power source voltage to the series regulator 70.

An operation of the power source circuit 1 will be explained next with reference to FIG. 2 and FIGS. 3(a) to 3(d). FIGS. 3(a) to 3(d) are graphs showing the operation of the power source circuit 1 according to the embodiment of the present invention.

In the embodiment, the wireless communication circuit 100 does not perform the wireless communication all the time. Rather, the wireless communication circuit 100 is repeatedly in the operation state and the idle state for a specific period of time. In particular, the wireless communication circuit 100 is configured to shorten a rising period when the power source circuit 1 is transited from the idle state to the operation state, an operation period when the wireless communication circuit 100 perform the wireless communication, and a down period when the power source circuit 1 is transited from the operation state to the idle state. Accordingly, it is possible to maintain the idle state of the power source circuit 1, in which the power consumption of the power source circuit 1 is low, as long as possible.

In a first operation state as the operation state of the power source circuit 1 when the power source circuit 1 starts operating, before the power source circuit 1 is transited to the idle state, the power source voltage is measured. When the power source voltage is greater than a specific voltage, the switching portion 80 is controlled to turn off. Further, the switching regulator 60 and the series regulator 70 are operated, so that the output voltage is supplied to the wireless communication circuit 100.

In a second operation state as the operation state of the power source circuit 1 when the power source voltage is smaller than the specific voltage, the switching portion 80 is controlled to turn on. Further, the switching regulator 60 stops operating and the series regulator 70 is operated, so that the power source voltage is directly supplied to the series regulator 70, and the output voltage is supplied to the wireless communication circuit 100.

In the embodiment, the first operation state and the second operation state are not switched during a period of time when the power source circuit 1 in the operation state. Rather, the power source circuit 1 is in the operation state while the power source circuit 1 is being in either of the first operation state and the second operation state for a specific period of time. It should be noted that the specific voltage may be a voltage as a ratio of the power source voltage corresponding to 60% of a period from when the power source 10 is fully charged to when the power source 10 is completely discharged. Alternatively, the specific voltage may be set through reversely calculating from the operation range of the switching regulator 60. In the embodiment, the specific voltage is set, for example, 2.3 V calculated from the operation range of the switching regulator 60.

In a first idle state as the idle state of the power source circuit 1, when the power source voltage is greater than the specific voltage, the switching portion 80 is controlled to turn off. Further, the switching regulator 60 and the series regulator 70 are in the idle state, so that the power source circuit 1 is in the idle state. In a second idle state as the idle state of the power source circuit 1 when the power source voltage is smaller than the specific voltage, the switching portion 80 is controlled to turn on. Further, the switching regulator 60 and the series regulator 70 stop operating, so that the power source circuit 1 is in the idle state.

A process of controlling the operation state and the idle state of the power source circuit 1 when the power source 10 is gradually discharged and the power source voltage is decreasing after the power source 10 is fully charged will be explained next.

Figure 3:
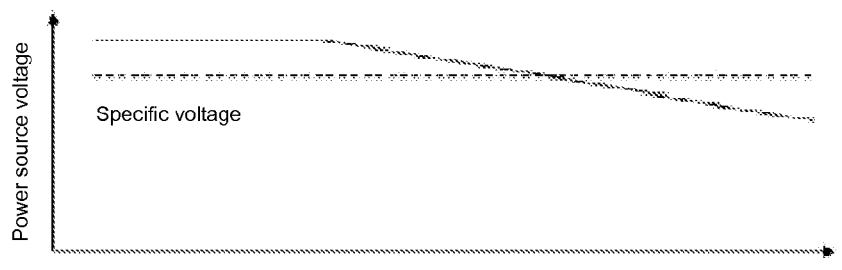
Figure 3:
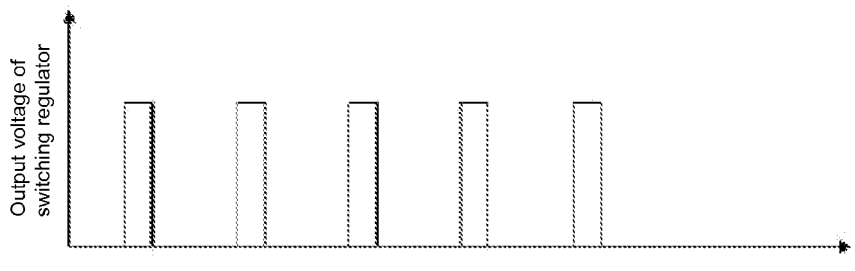
Figure 3:
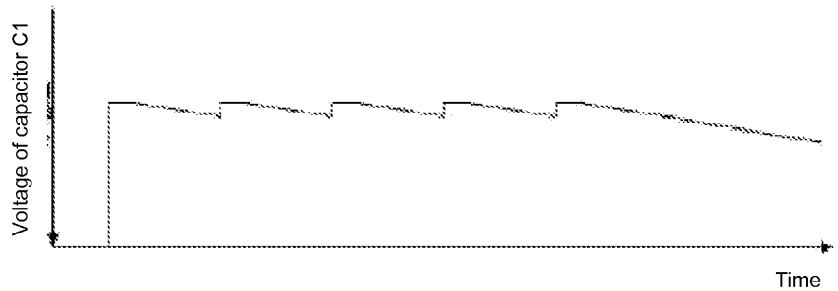
Figure 3:
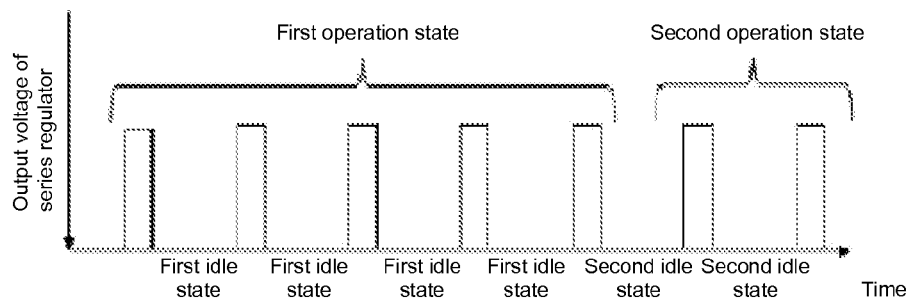

FIG. 3(*a*) is a graph showing the power source voltage of the power source circuit 1. FIG. 3(*b*) is a graph showing the output voltage of the switching regulator 60 of the power source circuit 1. FIG. 3(*c*) is a graph showing the voltage of the capacitor C1 of the power source circuit 1. FIG. 3(*d*) is a graph showing the output voltage of the series regulator 70 of the power source circuit 1.

In the embodiment, when the power source voltage is 3.6 V and greater than the specific voltage of 2.2 V as shown in FIG. 3(*a*), the power source circuit 1 is operating in the first operation state for a specific period of time. Accordingly, as shown in FIGS. 3(*b*) and 3(*d*), the switching regulator 60 and the series regulator 70 output the output voltages. Before the specific period of time is elapsed, the power source voltage measuring portion 30 measures the power source voltage and outputs the measurement result to the control portion 90. It should be noted that the power source voltage measuring portion 30 includes the AD converter as described above. Accordingly, it is necessary to supply an electrical current of about 1 mA, so that the power source voltage measuring portion 30 tends to have large power consumption. For this reason, when the power source circuit 1 is in the idle state, the power source voltage measuring portion 30 stops operating.

Further, as shown in FIG. 3(*c*), the capacitor C1 is accumulating a potential corresponding to the output voltage of the switching regulator 60.

In the embodiment, the control portion 90 measures the measurement result of the power source voltage from the power source voltage measuring portion 30 with the specific voltage. When the measurement result of the power source voltage is greater than the specific voltage, the power source circuit 1 becomes the first idle state, in which the switching portion 80 is turned off, and the switching regulator 60 and the series regulator 70 stop operating as shown in FIGS. 3(*a*), 3(*b*), and 3(*d*).

At this moment, when the power source circuit 1 is switched from the first idle state to the operation state, the power source voltage is still greater than the specific voltage. Accordingly, it is configured that the power source circuit 1 is switched from the first idle state to the operation state such that the power source circuit 1 switched to the first operation state. More specifically, after the power source circuit 1 is in the idle state for the specific period of time, the control portion 90 outputs the switching signal and the control signal, so that the switching portion 80 is turned off, and the switching regulator 60 and the series regulator 70 are operating.

In the embodiment, when the power source circuit 1 performs the operation described above, in the idle state, the PMOS transistor 41 and the NMOS transistor 42 of the switching circuit 40 are turned off; the PMOS transistor 71 of the series regulator 70 is turned off; and the PMOS transistor 81 of the switching portion 80 is turned off, so that the power source circuit 1 becomes the idle state. Accordingly, the capacitor C1 of the smoothing circuit 50 is isolated from any path and becomes the idle state while maintaining electron charges accumulated during the operation state. When the power source circuit 1 is transited from the first idle state to the operation state, electron charges of the capacitor C1 are stored unchanged as in the operation state. Accordingly, it is possible to start the operation without charging the capacitor C1, thereby shortening the raising speed.

Further, in the embodiment, the power source circuit 1 is configured in advance such that the power source circuit 1 is transited to the first operation state when the power source circuit 1 is transited to the operation state. Accordingly, when the power source circuit 1 is transited to the operation state, it is possible to transit to the operation state without confirming the state of the power source voltage after the power source voltage measuring portion 30 is started up and the power source circuit 1 is transited to the operation state, thereby shortening the raising speed. It should be noted that the capacitance of the capacitor C1 tends to be decreased when the power source circuit 1 is transited from the idle state to the operation state to more extent than when the power source circuit 1 is transited from the operation state to the idle state. Accordingly, the capacitance of the capacitor C1 is gradually decreased during the idle state as shown in FIG. 3(*c*).

In the embodiment, when the power source voltage is decreased due to discharging and the measurement result of the power source voltage measuring portion 30 becomes below the specific voltage during the first operation state, the power source circuit 1 is transited to the second idle state, in which the switching portion 80 is turned on, and the switching regulator 60 and the series regulator 70 become the idle state. When the power source circuit 1 is transited from the second idle state to the operation state, the power source voltage is still below the specific voltage at this moment. Accordingly, in order to transit to the second operation state, it is configured in advance such that the control portion 90 outputs the switching signal and the control signal so that the switching portion 80 is turned on, the switching regulator 60 becomes the idle state, and the series regulator 70 becomes the operation state after the specific period of time is elapsed. Accordingly, the power source circuit 1 is transited to the second idle state.

In the embodiment, as described above, when the power source circuit 1 is transited from the idle state to the operation state, the power source circuit 1 is configured in advance to transit to the second operation state. Accordingly, when the power source circuit 1 is transited to the operation state, it is possible to transit to the operation state without confirming the state of the power source voltage after the power source voltage measuring portion 30 is started up and the power source circuit 1 is transited to the operation state, thereby shortening the raising speed. Further, the power source circuit 1 is configured such that the capacitor C1 is connected to the power source voltage, so that the capacitor C1 holds electron charges, thereby shortening the raising speed. When the capacitor C1 is maintained with the power source voltage, a difference to the voltage appropriate for inputting the series regulator 70 is not generated when the power source circuit 1 is transited to the operation state. Accordingly, when the power source voltage is decreased, there is no loss associated with, thereby shortening the raising speed.

In the embodiment, when the power source circuit 1 is operating in the second operation state, the control portion 90 compares the measurement result of the power source voltage measuring portion 30 with the specific voltage. When the power source voltage is increased due to charging and the like, and exceeds the specific voltage, the control portion 90 controls the power source circuit 1 such that the power source circuit 1 is transited to the first idle state. At this moment, the power source voltage is still greater than the specific voltage, the power source circuit 1 is transited from the first idle state to the first operation state. Further, when the power source voltage becomes lower than the specific voltage when the power source circuit 1 is operating in the second operation state, the control portion 90 controls the power source circuit 1 such that the power source circuit 1 is transited to the second idle state. Similarly, the power source circuit 1 is transited from the second idle state to the second operation state.

As described above, in the embodiment, according to the power source voltage, the idle state and the operation state afterward are controlled, so that it is possible to shorten the raising speed from the idle state to the operation state. Further, it is possible to reduce the power consumption of the power source circuit 1.

In the embodiment, it should be noted that the configuration and the operation of the power source circuit 1 are examples, and the present invention may be modified within the scope of the invention. For example, the control portion 90 may be configured such that, when the wireless communication circuit 100 is attached to a battery and starts operating, the power source circuit 1 is started in the second operation state for adjusting the switching regulator 60. After the switching regulator 60 is started, the power source voltage is measured to determine the next idle state, so that the power source circuit 1 is transited to the corresponding idle state.

Further, the control portion 90 may be configured such that the power source circuit 1 is started in the first operation state all the time upon the initial start up. After the power source voltage is measured, the power source circuit 1 is transited to the idle state. When the idle state is prolonged for a long period of time, the power source voltage may fluctuate to a large extent. In this case, the control portion 90 may be provided with a timer portion and the like. Further, the control portion 90 may be configured such that, when the power source circuit 1 is not transited for a specific period of time, the power source circuit 1 is transited to the operation state according to an elapsed time of the idle state.

Further, the specific voltage in the first operation state may be set differently from the specific voltage in the second operation state. For example, the specific voltage in the first operation state may be set smaller than the specific voltage in the second operation state. Accordingly, when the power source circuit 1 is transited, a hysteresis may be generated. As a result, it is possible to prevent vibration transition between the first operation state and the second operation state near the specific voltage. Further, it may be configured such that, when the power source circuit 1 is transited from the first operation state to the second operation state through the idle state, the control portion 90 controls the power source circuit 1 with the timer portion to prohibit the state transition for a specific period of time.

The disclosure of Japanese Patent Application No. 2014-174540, filed on Aug. 28, 2014, is incorporated in the application by reference.

While the invention has been explained with reference to the specific embodiments of the invention, the explanation is illustrative and the invention is limited only by the appended claims.

What is claimed is:

1. A power source circuit, comprising:
   a power source terminal for inputting a power source voltage;
   a switching regulator including a switching circuit connected to the power source terminal and a smoothing circuit connected to the switching circuit;
   a series regulator connected to the switching regulator in series;
   a switching portion; and
   a control portion,
   wherein said smoothing circuit includes a capacitor and an inductor so that the smoothing circuit smoothes an output from the switching circuit to output a first voltage,
   said series regulator is connected to the switching circuit and the smoothing circuit in series, and is configured to receive the first voltage or the power source voltage so that the series regulator outputs a second voltage,
   said switching portion has a first terminal connected to the power source and a second terminal connected between the switching regulator and the series regulator so that the switching portion supplies the power source voltage to the series regulator,
   said control portion is configured to output a control signal for controlling an operation state in which the series regulator outputs the second voltage and an idle state in which the switching regulator and the series regulator stop operating, and
   said control portion is configured to measure the power source voltage during the operation state, and to output a switching signal for controlling the switching portion to turn on or off in the idle state according to a measurement result of the power source voltage.

2. The power source circuit according to claim 1, wherein said control portion is configured to output an operation signal for controlling the switching regulator and the series regulator to turn on or off according to the switching signal output during the idle state when the power source circuit is transited from the idle state to the operation state.

3. The power source circuit according to claim 1, wherein said control portion is configured to output the switching signal for controlling the switching portion to turn off when the power source voltage is greater than a specific voltage, and for controlling the switching portion to turn on when the power source voltage is smaller than the specific voltage so that the power source circuit is transited to the idle state.

4. The power source circuit according to claim 2, wherein said control portion is configured to output the operation signal for controlling the switching regulator and the series regulator to turn on when the power source voltage is greater than a specific voltage, and for controlling the switching regulator to turn off and the series regulator to turn on when the power source voltage is smaller than the specific voltage.

5. The power source circuit according to claim 1, wherein said switching circuit of the switching regulator includes:
- a first transistor of a first conductive type having a source electrode connected to the power source terminal and a drain electrode connected to the inductor;
- a second transistor of a second conductive type different from the first conductive type having a source electrode connected to the inductor and a drain electrode connected to ground;
- a pulse generation circuit for controlling the gate electrode of the first transistor and the gate electrode of the second transistor; and
- a comparison circuit for receiving a first reference voltage based on the power source voltage and the first voltage from the smoothing circuit, and for outputting a comparison result between the first reference voltage and the first voltage, and said control portion is configured to output the control signal to the pulse generation circuit to control the switching regulator.

6. The power source circuit according to claim 1, wherein said series regulator includes:
- an output transistor connected to the switching regulator and the switching portion for outputting the second voltage; and
- an operational amplifier for receiving a second reference voltage based on the power source voltage and the second voltage from the smoothing circuit, and for outputting a control voltage to a gate electrode of the output transistor, and said control portion is configured to output the control signal to the operational amplifier to control the series regulator.

7. A method of controlling a power source circuit, wherein said power source circuit includes:
- a power source terminal for inputting a power source voltage;
- a switching regulator including a switching circuit connected to the power source terminal and a smoothing circuit connected to the switching circuit;
- a series regulator connected to the switching regulator in series;
- a switching portion; and
- a control portion, said smoothing circuit includes a capacitor and an inductor so that the smoothing circuit smoothes an output from the switching circuit to output a first voltage, said series regulator is connected to the switching circuit and the smoothing circuit in series, and is configured to receive the first voltage or the power source voltage so that the series regulator outputs a second voltage, said switching portion has a first terminal connected to the power source and a second terminal connected between the switching regulator and the series regulator so that the switching portion supplies the power source voltage to the series regulator, and said method comprises the steps of:

measuring the power source voltage during an operation state of the power source circuit;

comparing the power source voltage thus measured with a specific voltage when the operation state is transited to an idle state;

controlling the switching regulator and the series regulator to be in the idle state, and controlling the switching portion to turn off when the power source voltage is greater than the specific voltage; and controlling the switching regulator and the series regulator to be in the idle state, and controlling the switching portion to turn on so that the power source circuit is switched to the idle state when the power source voltage is smaller than the specific voltage.

* * * * *